(12) United States Patent
Steiner et al.

(10) Patent No.: US 11,501,275 B2
(45) Date of Patent: Nov. 15, 2022

(54) POINT OF SALE OPTICAL-BASED DEVICE ASSOCIATION AND CONFIGURATION

(71) Applicant: Toshiba Global Commerce Solutions Holdings Corporation, Tokyo (JP)

(72) Inventors: David Steiner, Raleigh, NC (US); Charles Kirk, Raleigh, NC (US); Steven Low, Bishan (SG); Nancy Yaguda, Apex, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 159 days.

(21) Appl. No.: 16/376,752

(22) Filed: Apr. 5, 2019

(65) Prior Publication Data
US 2020/0320496 A1 Oct. 8, 2020

(51) Int. Cl.
*G06Q 20/20* (2012.01)
*G06K 7/10* (2006.01)

(52) U.S. Cl.
CPC ......... *G06Q 20/20* (2013.01); *G06K 7/10792* (2013.01)

(58) Field of Classification Search
CPC .. G06Q 20/20; G06K 7/10792; G07G 1/0009; G07G 1/0018
USPC .......................................................... 705/16
See application file for complete search history.

(56) References Cited

U.S. PATENT DOCUMENTS

| 8,342,407 | B2 | 1/2013 | Williams et al. |
|---|---|---|---|
| 8,380,177 | B2 | 2/2013 | Laracey |
| 8,565,913 | B2 | 10/2013 | Emanuel et al. |
| 8,879,994 | B2 | 11/2014 | Brown et al. |
| 9,449,202 | B2 | 9/2016 | Clare et al. |
| 10,140,829 | B1 | 11/2018 | Calvarese et al. |
| 2005/0116821 | A1 | 6/2005 | Wilsey et al. |
| 2009/0243844 | A1* | 10/2009 | Ishidera ........... G08B 13/19615 382/100 |
| 2010/0070376 | A1* | 3/2010 | Proud .................... G06Q 50/14 705/16 |
| 2014/0180777 | A1 | 6/2014 | Moshrefi et al. |
| 2015/0199668 | A1* | 7/2015 | Fernando ............... G06Q 20/20 705/16 |
| 2015/0269549 | A1 | 9/2015 | Herring et al. |
| 2016/0125587 | A1 | 5/2016 | Peterson et al. |
| 2016/0171566 | A1 | 6/2016 | Pugh et al. |
| 2017/0004475 | A1 | 1/2017 | White et al. |
| 2020/0279239 | A1* | 9/2020 | Ramamurthy ....... G06Q 20/382 |

FOREIGN PATENT DOCUMENTS

EP 3185186 A1 6/2017

* cited by examiner

*Primary Examiner* — Peter Ludwig
*Assistant Examiner* — Reva R Moore
(74) *Attorney, Agent, or Firm* — Patterson + Sheridan, LLP

(57) ABSTRACT

Techniques for configuring a point of sale (POS) system may include using an optical sensing module to read an identifier associated with a POS component and associating the POS component with a zone that is monitored by the optical sensing module, where the zone includes the POS system. In response to optically sensing the identifier, the system may automatically configure the component to function within the POS system.

18 Claims, 8 Drawing Sheets

POINT OF SALE OPTICAL-BASED DEVICE ASSOCIATION AND CONFIGURATION

BACKGROUND

The present disclosure relates to point of sale (POS) systems, and more specifically, though not exclusively, to updating or replacing components of a POS system.

A point of sale system can include multiple components in addition to a computerized cash register. For instance, a POS may include a printer for receipts, a scanner for product barcodes, and a payment receiving device, such as a credit card or phone application reader. A store may include multiple POSs in several lanes to accommodate an efficient checkout. Not all of the POS lanes may be in use at all times. When a component of a POS malfunctions, a sales associate can attempt to replace the failing component with a functioning one from a POS lane that may not be in use. Replacing a component may require programming and other configuring for which the sales associate has not been trained or does not have time.

SUMMARY

According to particular embodiment, a method of configuring a point of sale (POS) system may include using an optical sensing module to read an identifier associated with a POS component and associating the POS component with a zone that is monitored by the optical sensing module, where the zone includes the POS system. In response to optically sensing the identifier, the method may automatically configure the component to function within the POS system.

According to another particular implementation, a system may include an optical sensing module to read an identifier associated with a POS component, and a processor in communication with the optical sensing module. The processor may be configured to associate the POS component with a zone that is monitored by the optical sensing module, wherein the zone includes the POS system, and in response to the identifier being optically sensed, automatically configure the component to function within the POS system.

According to another particular implementation, a computer program product for configuring a POS system includes a computer-readable storage medium having computer-readable program code embodied therewith, the computer-readable program code executable by one or more computer processors to read an identifier associated with a POS component using an optical sensing module and to associate the POS component with a zone that is monitored by the optical sensing module, wherein the zone includes the POS system. In response to optically sensing the identifier, the computer-readable storage medium may automatically configuring the component to function within the POS system

DETAILED DESCRIPTION

An embodiment of a system may correctly and automatically associate a specific device with a corresponding, desired, POS checkout lane. The system may use an optical sensing module to associate and configure components with a POS lane or other portion of an assigned zone. An embodiment of the system enables users to readily swap-out or move devices between POS checkout lanes as desired. The system may accommodate any suitable wireless or wired network technology, including Ethernet/IP protocol-based systems, cellular based systems, and other mobile technologies to configure a complete POS system.

According to one implementation, the system may use cameras, defined zones, object recognition, infrared (IR) and other optical signaling techniques to associate and configure components in each lane. Each component may signal an identifier (ID) via the optical signifier that the camera may detect. For example, a light emitting diode (LED) may flash a code to the camera. Another or the same component may include bar code (digital or printed) or another printed or projected pattern, such as a set of color lines or rings. Another embodiment of a system may use radio frequency triangulation. Each associated component within a defined checkout lane zone may then become part of that checkout lane POS solution.

To this end, each POS checkout lane may have its own camera based zone. In one example, a POS device, such as a handheld scanner, may be moved from one lane to another. Once moved and recognized by the camera(s) in the new checkout lane zone, the handheld scanner may be automatically associated with the POS zone.

Figure 1A:
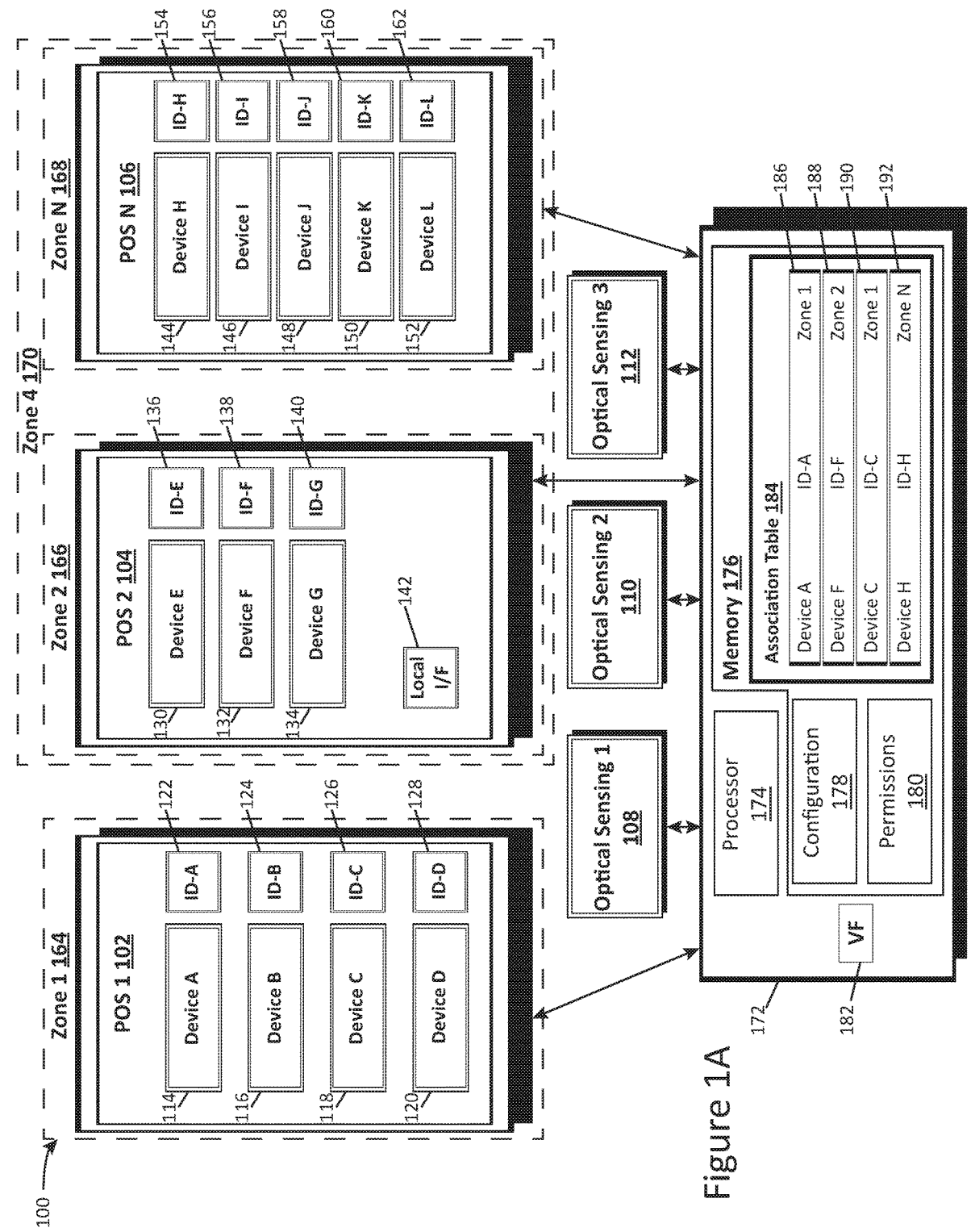
FIGS. 1A-B illustrate a system configured to use optical sensor modules to monitor zones that include POS components to be automatically associated and configured, according to one embodiment described herein.
Figure 1B:
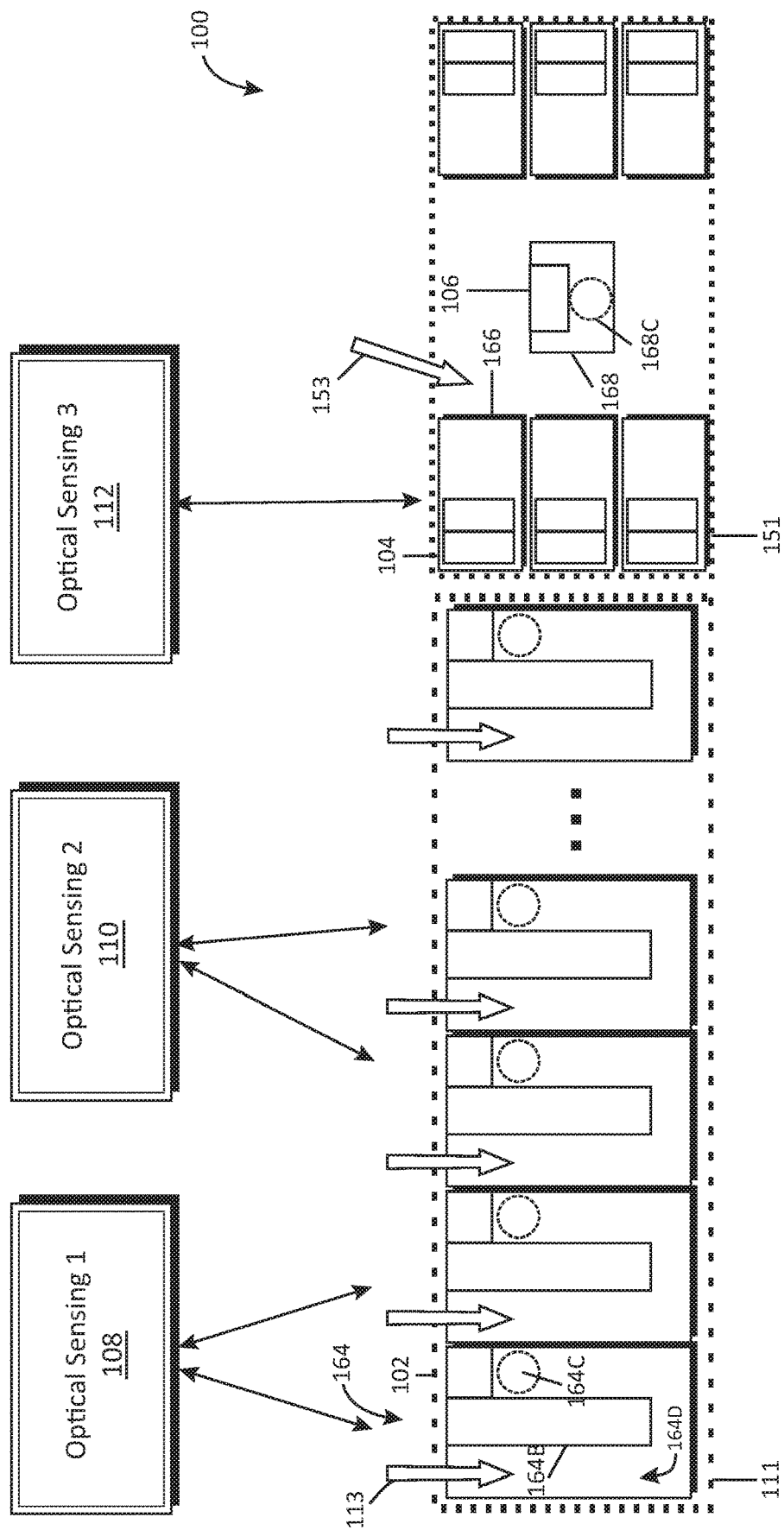

With reference now to the Drawings, FIGS. 1A-1B illustrate a system 100 configured to use optical sensor modules to monitor zones that include POS components to be automatically associated and configured, according to one embodiment described herein. FIG. 1A includes a system 100. The system 100 includes POS system 102, POS system 104, and POS system 106. The POS system 102 may include multiple components, or devices 114, 116, 118, and 120. Illustrative devices 114, 116, 118, and 120 may include a register, a handheld scanner, a printer for receipts, a scanner for product barcodes, and a payment receiving device, such as a credit card or phone application reader, among others known in the industry. Though not shown, each device 114, 116, 118, 120 may include a processor, a memory, a radio or infrared transceiver, a programming interface, an operating protocol, application software, and other components and software suitable to enable interaction, compatibility, and other functionality with other devices of the POS system 102.

Each device 114, 116, 118, and 120 may also include a corresponding identifier 122, 124, 126, and 128. For example, as illustrated in FIG. 1A, the device 114 includes a corresponding identifier 122. The identifiers may be affixed to, proximate, or integral with a respective device 114, 116, 118, and 120. Illustrative identifiers may include printed information, light emitting diodes (LEDs), barcodes, radio frequency emitters, among other features that be detected by an optical sensing device 108, 110, and 112. According to one embodiment of the system 100, an identifier may include recognizable features of the device 114, 116, 118, and 120, such as a shape and color of the device 114, 116, 118, 120. Alternatively, instead of or in addition to including recognizable features of its corresponding device 114, 116, 118, and 120, the identifier 122, 124, 126, or 128 may include a code or other information suitable to identify the corresponding device (e.g., uniquely based on retrieval from a suitable electronic database) using an optical sensing device (e.g., one of the optical sensing devices 108, 110, and 112).

POS system 104 may similarly include devices 130, 132, and 134. Each device 130, 132, and 134 may also include a corresponding identifier 136, 138, and 140. For example, as illustrated in FIG. 1A, the device 130 includes a corresponding identifier 136. The identifiers may be affixed to, proximate, or integral with a respective device 130, 132, and 134. Illustrative identifiers may include printed information, light emitting diodes (LEDs), barcodes, radio frequency emitters, among other features that can be detected by an optical sensing module 108, 110, and 112. According to one embodiment of the system 100, an identifier may include recognizable features of the device 130, 132, and 134, such as a shape and color of the device 130, 132, and 134. Alternatively, instead of or in addition to including recognizable features of its corresponding device 130, 132, and 134, the identifier 136, 138, or 140 may include a code or other information suitable to identify the corresponding device (e.g., uniquely based on retrieval from a suitable electronic database) using an optical sensing device (e.g., one of the optical sensing devices 108, 110, and 112).

Similarly, POS system 106 may include devices 144, 146, 148, 150, and 152. Each device 144, 146, 148, 150, and 152 may also include a corresponding identifier 154, 156, 158, 160, and 162. For example, as illustrated in FIG. 1A, the device 144 includes a corresponding identifier 154. The identifiers may be affixed to, proximate, or integral with a respective device 144, 146, 148, 150, and 152. Illustrative identifiers may include printed information, light emitting diodes (LEDs), barcodes, radio frequency emitters, among other features that be detected by an optical sensing module 108, 110, and 112. According to one embodiment of the system 100, an identifier may include recognizable features of the device 144, 146, 148, 150, and 152, such as a shape and color of the device 144, 146, 148, 150, and 152. Alternatively, instead of or in addition to including recognizable features of its corresponding device 144, 146, 148, 150, and 152, the identifier 154, 156, 158, 160, or 162 may include a code or other information suitable to identify the corresponding device (e.g., uniquely based on retrieval from a suitable electronic database) using an optical sensing device (e.g., one of the optical sensing devices 108, 110, and 112).

In one embodiment, the POS system 102 may be monitored using the optical sensing device 108. To this end, the POS system 102 may be designated within a zone 164 associated with the optical sensing module 108. Similarly, the POS system 104 may be monitored using the optical sensing device 110. The POS system 104 may be designated within a zone 166 associated with the optical sensing module 110. The POS system 106 may further be monitored using the optical sensing device 112. The POS system 106 may be designated within a zone 168 associated with the optical sensing module 112. In an embodiment, the zones 166 and 168 may be further subsumed in a larger zone including both the POS 104 and the POS 106.

The boundaries of the zones may be determined based on ease of demarcation, according to system capability or functionality, or in any suitable manner. For example, the zone 164 may be determined to enable visual surveillance of all or part of POS 102. Similarly, the zone 166 may be determined to enable continuous monitoring and configuration of POS 104, and the zone 168 may be determined to enable continuous monitoring and configuration of POS 106. In an embodiment, as discussed above, a zone may include multiple POS systems 104 and 106. These are merely examples, and in other embodiments zones may (or may not) overlap for redundancy considerations.

Figure 7:
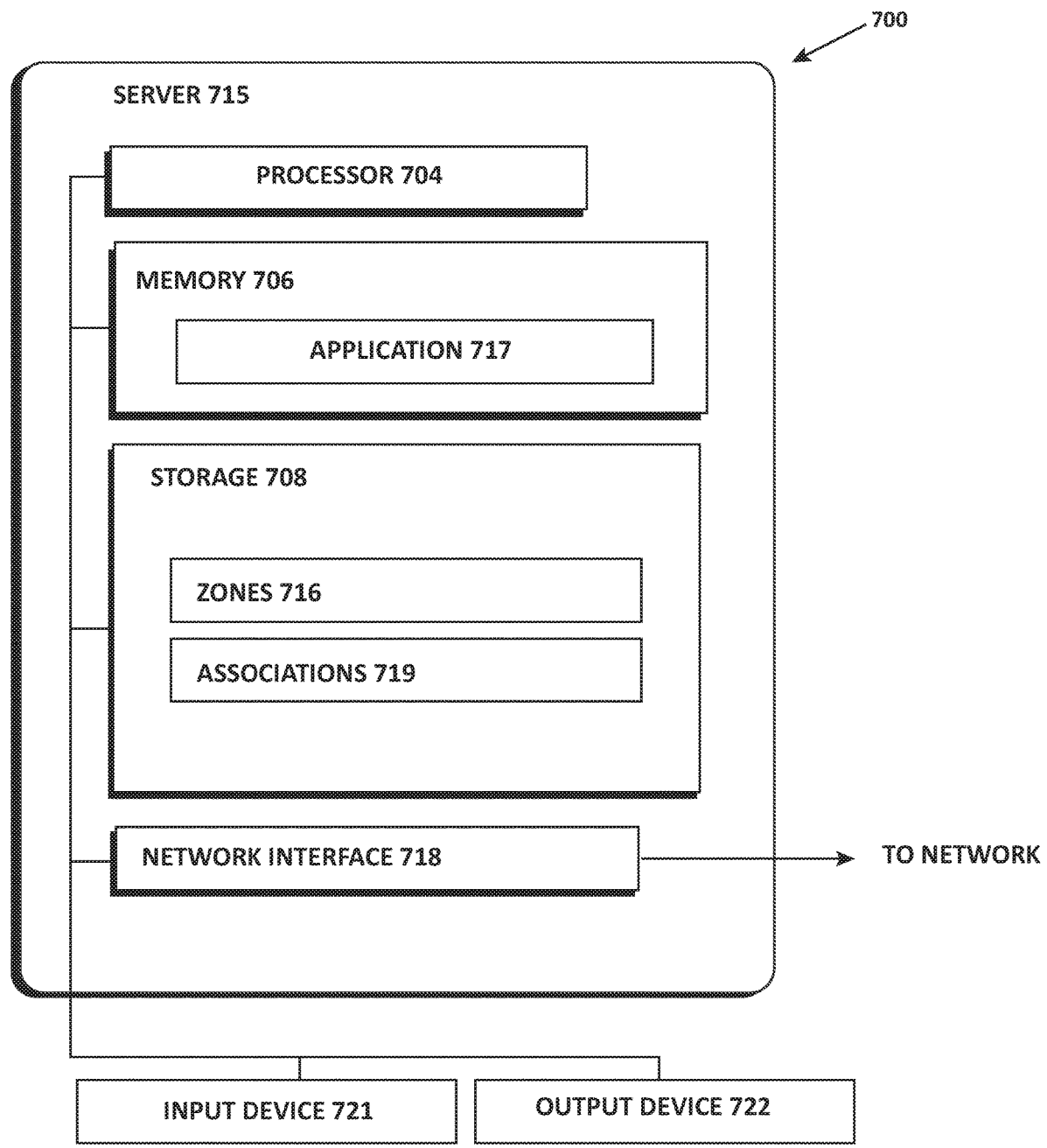
FIG. 7 further illustrates an example computing system, according to one embodiment described herein.

The optical sensing devices 108, 110, 112 may be configured to monitor any changes to components within an assigned zone(s). Data may be communicated between the optical sensing devices 108, 110, 112 and a configuration module 172. In an embodiment, the configuration module 172 is a suitable computer (e.g., a server 715 as illustrated in FIG. 7). The configuration module 172 may include a processor 174 and an interface (I/F) for communicating wirelessly with the POS 102, 104, and 106 components and the optical sensing devices 108, 110, and 112. The wireless interface may be any suitable wireless interface, including a radio interface (e.g., WiFi or a cellular interface), an infrared interface, etc. In one example, the configuration module 172 may communicate with POS 104 (e.g., devices 130, 132, and 134) via a local I/F 142. For example, the local I/F 142 may be a wireless interface, and the configuration module 172 may communicate with the POS 104 using the wireless I/F 142. Alternatively, the local I/F 142 may be a wired interface (e.g., Ethernet, telephone, coaxial, or another suitable wired interface) and the configuration module 172 may communicate with the POS 104 using the wired I/F 142.

The configuration module 172 also includes a memory 176 having configuration logic 178 and permissions logic 180. The permissions logic 180 may be used to grant access to software of a particular device (e.g. a POS device) to be activated or deactivated. In one embodiment, the configuration logic 178 may configure software of a POS device to be compatible or otherwise function within the POS (e.g., the POS 102, 104, or 106) to which the POS device has been added. Alternatively, each POS 102, 104, and 106 may include its own configuration software to enable removing, and attaching, POS devices. This is discussed further with regard to FIG. 5, below.

An association table 184 of the memory 176 may include modifiable entries 186, 188, 190, 192 that logically link and maintain assignments of devices and/or their identifiers to a zone. The entries and assignments may be updated as devices are swapped out for one another, or as devices are otherwise added to a zone. In an embodiment, the association table 184 is a suitable electronic database (e.g., a relational database or another suitable database) in communication with the configuration module 172. Alternatively, the association table 184 is stored locally in the memory 176 of the configuration module 172.

For example, as illustrated in FIG. 1A, the association table 184 includes a first entry 186 with an association of the Device A (e.g., device 114) with the ID-A (e.g., ID 122) in Zone 1 (e.g., the zone 164). The association table 184 further includes a second entry 188 with an association of the Device F (e.g., device 132) with the ID-F (e.g., ID 138) in Zone 2 (e.g., the zone 166). The association table 184 further includes a third entry 190 with an association of the Device C (e.g., device 118) with the ID-C (e.g., ID 126) in Zone 1 (e.g., the zone 164). The association table 184 further includes a fourth entry 192 with an association of the Device H (e.g., device 144) with the ID-H (e.g., ID 154) in Zone N (e.g., the zone 168). In an embodiment, these entries 186, 188, 190, and 192 are used by the configuration module 172 to automatically add and remove POS devices between the zones 164, 166, and 168. This is discussed further with regard to FIGS. 2-7, below.

FIG. 1B illustrates an exemplary arrangement of POS terminals and optical within a checkout area of an environment, according to one embodiment. The checkout area may be sub-divided into a manned checkout portion 111 and a self-checkout portion 151. The manned checkout portion 111 includes a number of zones (e.g., checkout lanes), including a zone 164 (e.g., the zone 164 illustrated in FIG. 1A). The zone 164 includes a pathway 164D, a checkout counter 164B, and a POS system (e.g., a checkout terminal) 102 (e.g., the POS system 102 illustrated in FIG. 1A) operated by an assigned employee 164C. For example, a person desiring to begin a checkout transaction at zone 164 enters the corresponding pathway 164D along the direction of arrow 113. The zone 164 may be monitored using an optical sensing device 108 (e.g., the optical sensing device 108 illustrated in FIG. 1A).

The self-checkout portion 151 includes a number of zones (e.g., self-checkout lanes), including a zone 166 (e.g., the zone 166 illustrated in FIG. 1A). The zone 166 includes a POS system (e.g., a self-checkout terminal) 104 (e.g., the POS 104 illustrated in FIG. 1A). Generally, a person desiring to begin a checkout transaction at the zone 166 may enter the portion 151 and approach the selected zone 166 along the general direction of the arrow 153. An additional zone (e.g., an employee station) 168 (e.g., the zone 168 illustrated in FIG. 1A) may be disposed within the self-checkout portion 151. The zone 168 may include a separate POS system (e.g., a computer-based terminal) 106 (e.g., the POS system 106 illustrated in FIG. 1A). An assigned employee 168C may be present to assist persons completing checkout transactions in the zone 166, to audit transactions, etc. The zones 166 and 168 may be monitored using an optical sensing device 112 (e.g., the optical sensing device 112 illustrated in FIG. 1A).

In some embodiments of the system, operation may be instantly transferred from one zone to another. In other embodiments, operational control may be time delayed. In one scenario, a device may stray into an adjacent zone for a brief time. For example, a relatively lengthy board at a lumber store may be purchased at a POS. As the board moves through the POS, it may cross into multiple device zones. To scan a bar code attached to an end of the board, a cashier may have to position themselves with a bar code scanner in an adjacent zone. During such an occurrence, the system may prevent operational control to transfer to the adjacent zone if the transaction is underway. In another embodiment of the system, functionality may transfer to the new zone when the bar scanner has entered the new zone and remains (e.g., dwells) within the new zone for a preconfigured dwell time.

Figure 2:
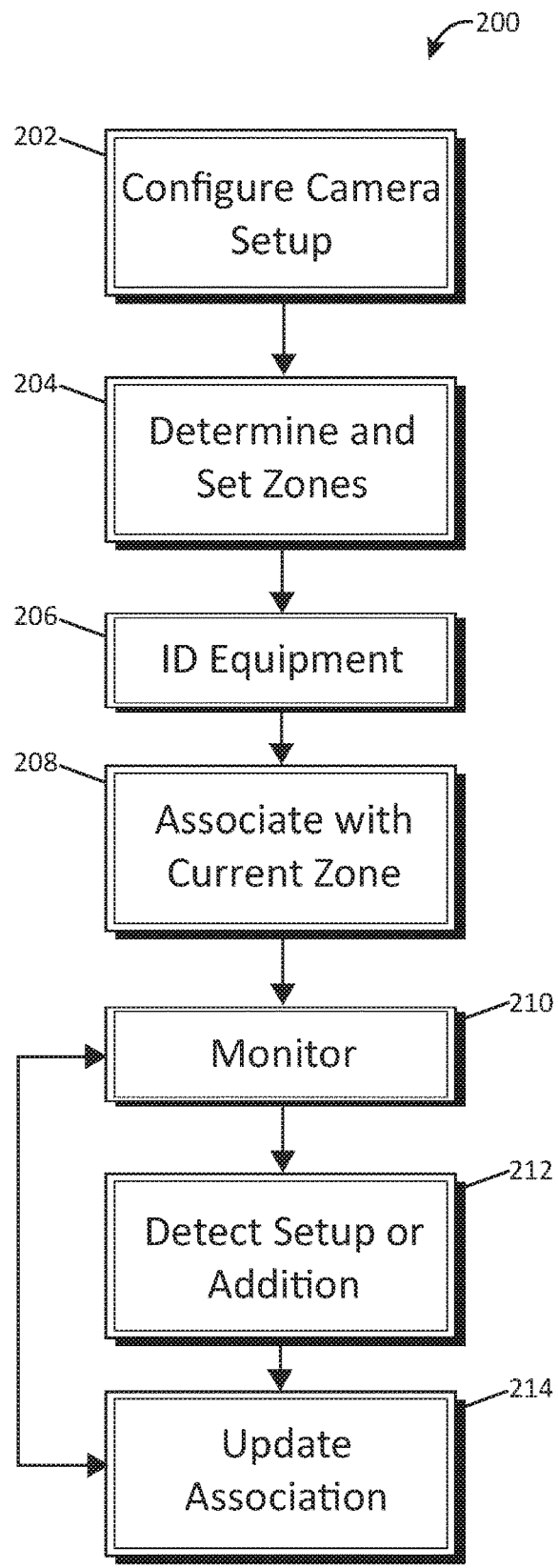
FIG. 2 is a flowchart illustrating automatically configuring a POS system, according to one embodiment described herein.

FIG. 2 is a flowchart 200 illustrating automatically configuring a POS system (e.g., the system 100 illustrated in FIGS. 1A-B), according to one embodiment described herein. In FIG. 2, at block 202 a camera configuration may be set up. For instance, one or more cameras or other optical sensing devices may be installed to view an area that includes one or more POS lanes. In an embodiment, any suitable optical sensing devices may be used, including visible light sensors, ultraviolet light sensors, infrared light sensors, etc.

At block 204, zone boundaries may be manually or automatically determined. In the example shown in FIGS. 1A-B, for example, zones 164, 166, and 168 may be designated according to the positioning of the optical sensing devices 108, 110, and 112 and POS systems 102, 104, and 106, as well as based on any redundancy considerations.

At block 206, the identifiers of the POS devices within the zones may be detected using optical devices. In an embodiment, any suitable optical sensing technique could be used. For example, the optical sensors 108, 110, and 112 can be digital video cameras. At block 206, video analytics or image recognition software can be used to analyze frames of digital video captured using the optical sensors and to identify the POS device using its identifier. For example, the POS device could include a barcode (e.g., a sticker) encoding the identifier for the POS device. The optical sensors 108, 110, and 112 could identify and parse the barcode to determine the identifier for the POS device. In an embodiment, this can be a one-dimensional barcode, a two-dimensional barcode, or any other suitable barcode. The barcode can be visible to the human eye, or can be a digimark or other suitable barcode invisible to the human eye (e.g., an ultraviolet barcode)

Alternatively, the POS device could include an LED or other light emitting component to provide the identifier. For example, the POS device could include an LED blinking in a pattern encoding the identifier for the device. This LED can emit light in the visible light spectrum, or in a spectrum not visible to the human eye (e.g., in the infrared spectrum). The optical sensors 108, 110, and 112 can identify the pattern of the LED emissions and determine the identifier associated with the POS device.

As another alternative, radio-frequency (RF) triangulation could be used to identify and locate the POS device. For example, the 802.11mc wireless standard includes various information relating to RF identification. In an embodiment, an RF transmission could be used to identify the POS device (e.g., using RFID). Further, multiple RF transmissions could be used to determine the location of the POS device (e.g., which zone the POS device is in). For example, the system can receive multiple RF transmissions for the POS device at various angles, and can use these transmissions to determine the location of the POS device (e.g., using the intensity of the signals, precise time measurements to identify distance from an origin, or any other suitable technique). In an embodiment, this RF triangulation could be used instead of, or in addition to, optical sensing.

The identifiers may be used to populate an inventory stored in an association table (e.g., the association table 184 illustrated in FIG. 1A). At block 208, the identifiers and associated devices may be logically linked within the association table to a zone. For example, one or more rows may be created or modified in the association table to logically link the identifiers and associated devices with the corresponding zone.

At block 208, the system may monitor the devices within a zone using the optical sensing device (e.g., one of the optical sensing devices 108, 110, and 112 illustrated in FIGS. 1A-B). At block 210, when one device is swapped out for a different device in a POS system, a new device is added to a POS system, or a device is removed from a POS system, the system may detect the change using the identifiers. For example, the system may periodically or continuously scan the devices within the zone to determine whether all devices previously assigned to the zone are still present. The system may likewise detect if a device has been added to the zone since a prior optical inventory scanning process.

At block 212, when a change is detected the system may communicate signals to the added device and to other devices within the POS to enable the added device to function within the POS. This is discussed further with regard to FIG. 3.

At block 214, the system may record that the device is now associated with the POS or zone of the POS to which the device moved. For instance, the system 100 of FIG. 1 may update an entry 186 of the association table 184. The system of an embodiment may proceed to continuously monitor the zone for additional changes at block 210.

Figure 3:
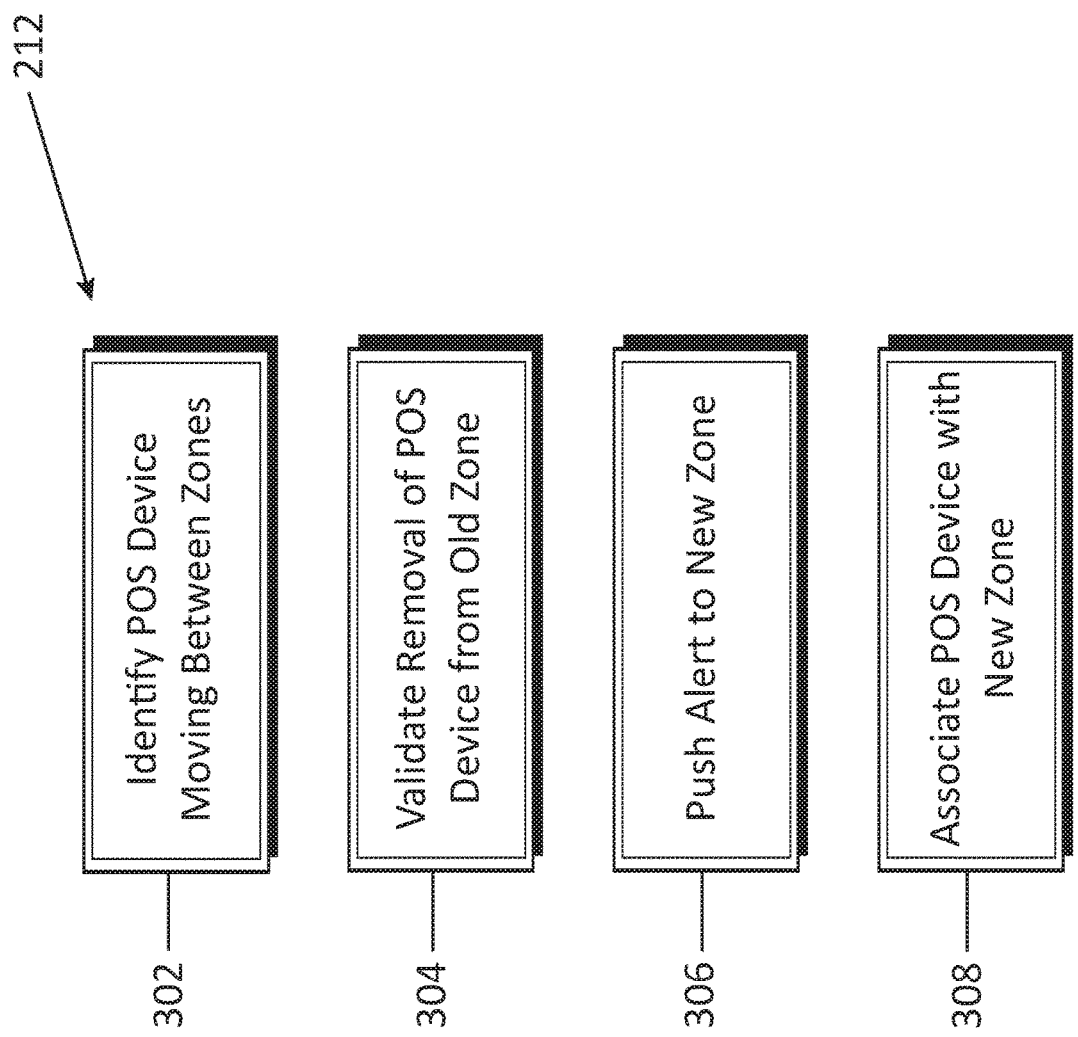
FIG. 3 is a flowchart illustrating detecting setup or addition of a POS device, according to one embodiment described herein.

FIG. 3 is a flowchart illustrating detecting setup or addition of a POS device, according to one embodiment described herein. In an embodiment, FIG. 3 corresponds with block 212 illustrated in FIG. 2. At block 302, the system (e.g., the system 100 illustrated in FIGS. 1A-B) identifies a POS device moving between zones. For example, as illustrated in FIG. 1A, a device 114 (e.g., a receipt printer) may be associated with an identifier 122. An association table 184 can include an entry 186 associating the device 114 and its identifier 122 with zone 164 (e.g., a particular checkout lane containing the POS system 102). A store employee can move the device 114 from the zone 164 to another zone 166. At block 302, the system uses one or more optical sensing devices (e.g., the optical sensing devices 108 and 110 illustrated in FIG. 1A) to identify this move. For example, the optical sensing device 108 can be used to identify that the device 114 has left the zone 164. The optical sensing device 110 can then be used to identify that the device 114 has entered the zone 166.

At block 304, the system validates removal of the POS device from the old zone. For example, as discussed above with regard to block 302, the system can validate removal of the device 114 from the zone 164. This is discussed further with regard to FIG. 4.

At block 306, the system pushes an alert to the new zone. For example, as discussed above with regard to block 302, the system can push an alert to the zone 166 noting that the device 114 has entered the zone 166. In one embodiment, a configuration module (e.g., the configuration module 172 illustrated in FIG. 1A) transmits a wired, or wireless, communication message to the POS system (e.g., the POS system 104 illustrated in FIG. 1A) in the new zone. Any suitable wired or wireless message can be used. Further, as discussed above with regard to FIG. 1A, the configuration module can communicate with the POS system 104 using the local I/F 142 (or using any other suitable wireless or wired techniques).

At block 308, the system associates the POS device with the new zone. This is discussed further with regard to FIG. 5.

Figure 4:
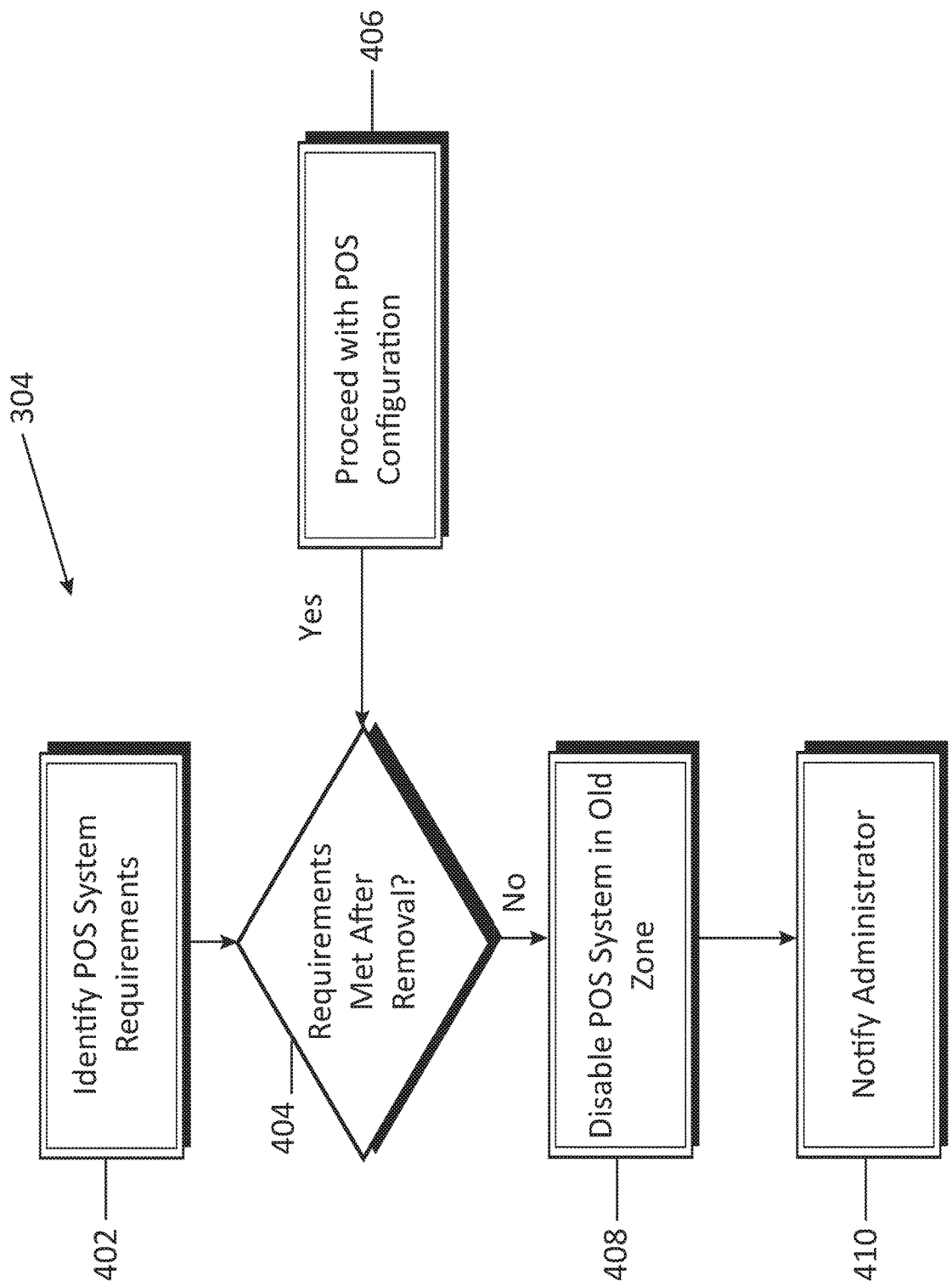
FIG. 4 is a flowchart illustrating validating removal of a POS device from a zone, according to one embodiment described herein.

FIG. 4 is a flowchart illustrating validating removal of a POS device from a zone, according to one embodiment described herein. In an embodiment, FIG. 4 corresponds with block 304 in FIG. 3. At block 402, the system (e.g., the system 100 illustrated in FIGS. 1A-B) identifies POS system requirements for the zone from which the POS device is being removed. In an embodiment, each operating POS system may be required to include particular components. These requirements may come from a POS system requirement, a store policy, a retailer policy, or a local or national law or regulation. For example, certain jurisdictions require that an operating POS system include a display facing the customer so that the customer can view prices as items are scanned. In an embodiment, these systems are stored in a suitable electronic database, stored locally, available over the internet, or in any suitable location. At block 402, the system can identify and retrieve policies associated with a POS system in the zone from which the device is being removed (e.g., the POS system to which the POS device was previously connected).

At block 404, the system determines whether POS system requirements are still met after removal of the POS device. For example, a customer facing screen may be moved between zones. At block 402, the system identifies the policy requiring that all operating POS systems include a customer facing screen. At block 404, the system determines whether removing the customer facing screen from the POS system in the old zone violates the POS system requirement (e.g., does the POS system to which the customer facing screen was previously connected still include another customer facing screen). If the requirements are met, the system proceeds to block 406 and proceeds with POS configuration.

At block 408, if the requirements are not met, the system disables the POS system in the old zone. For example, the system can transmit a wired or wireless electronic message to the POS system in the old zone disabling the POS system. In an embodiment, the POS system will then not operate for customers until it is re-configured so that its requirements are met (e.g., until the missing component is replaced). Disabling the POS system is merely one example of an action that can be taken at block 408. Other suitable actions could be taken instead of, or in addition to, disabling the POS system in the old zone.

At block 410, the system notifies an administrator. For example, the system can notify a system administrator that the POS system in the old zone no longer meets requirements and has been disabled. As another example, the system can notify employees using the POS systems that the POS system in the old zone no longer meets requirements.

Figure 5:
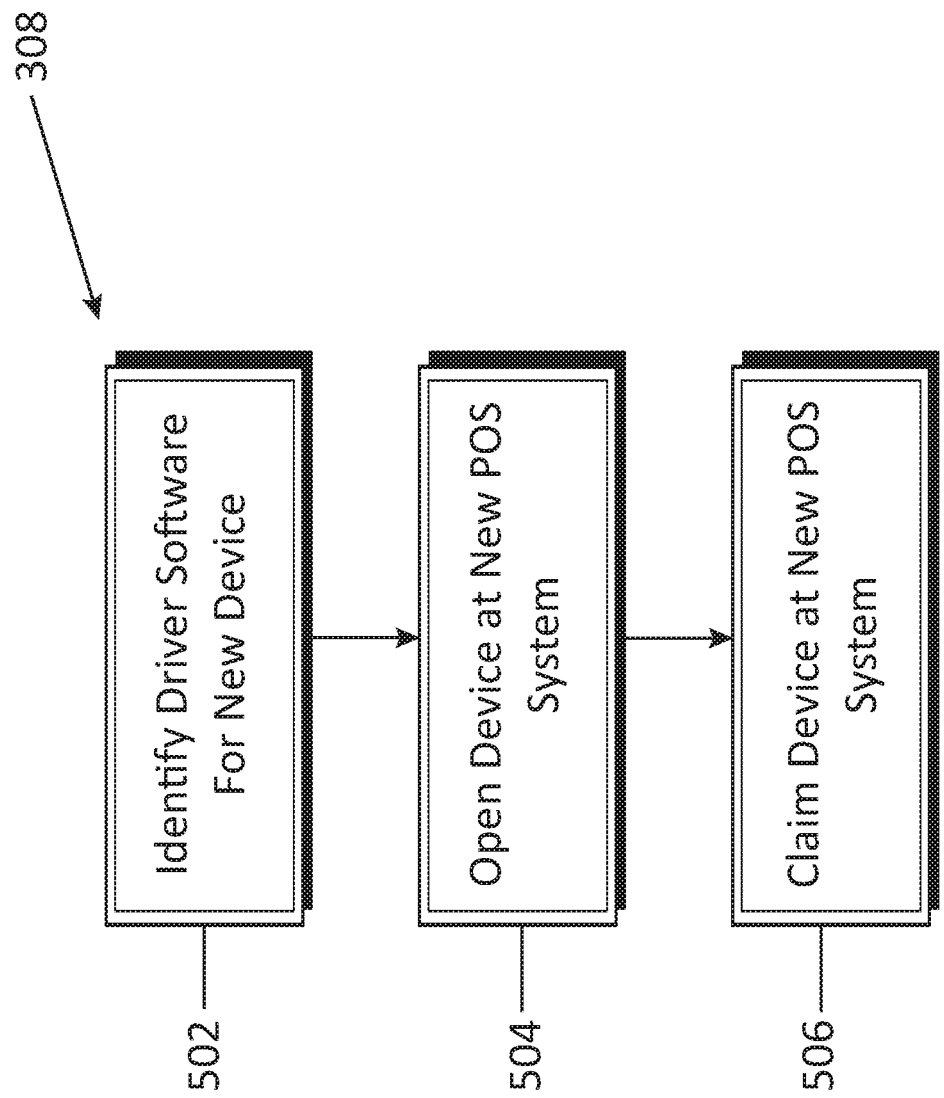
FIG. 5 is a flowchart illustrating associating a POS device with a new zone, according to one embodiment described herein.

FIG. 5 is a flowchart illustrating associating a POS device with a new zone, according to one embodiment described herein. In an embodiment, FIG. 5 corresponds with block 308 illustrated in FIG. 3. At block 502, the system identifies driver software for the new device. In an embodiment, this is done by the POS system itself. Alternatively, this is done by a server, central controller, or another device. In an embodiment, the system can identify suitable driver software for the new POS device, and can ensure that the POS system includes this software. For example, a configuration module can retrieve driver software (e.g., from a central location, a local server, a manufacturer website, or elsewhere) and can provide the driver software to the POS system. As another example, the POS system itself can retrieve the driver software. Further, the system may determine that the POS system includes out of date driver software. In an embodiment, the system (e.g., the POS system itself or another suitable system) can update the driver software on the POS system.

At block 504, the system opens the new POS device at the new POS system. For example, the POS system can use the driver software identified at block 502 to open the new device.

At block 506, the POS system claims the new device. For example, the POS system can use the driver software identified at block 502 to claim the new device. In an embodiment, the POS system can be associated with include multiple similar devices. For example, the new device could be a receipt printer, and the POS system could already be associated with a receipt printer. In an embodiment, the POS system is configured so that the prior device (e.g., the prior receipt printer) takes priority (e.g., any receipt is sent to the prior receipt printer for printing). The new device is then given priority once the prior device is removed. Alternatively, the new device (e.g., the new receipt printer) can be given priority.

Alternatively, both the prior and the new device can be enabled. For example, the new device could be a barcode scanner (e.g., a wireless handheld barcode scanner), and the POS system could already be associated with a barcode scanner. In this example, both barcode scanners could be used with the POS system. For example, two employees could scan items; one using the prior barcode scanner and the other using the newly introduced barcode scanner. Alternatively, the prior or new barcode scanner could each be used, according to employee preference.

Figure 6:
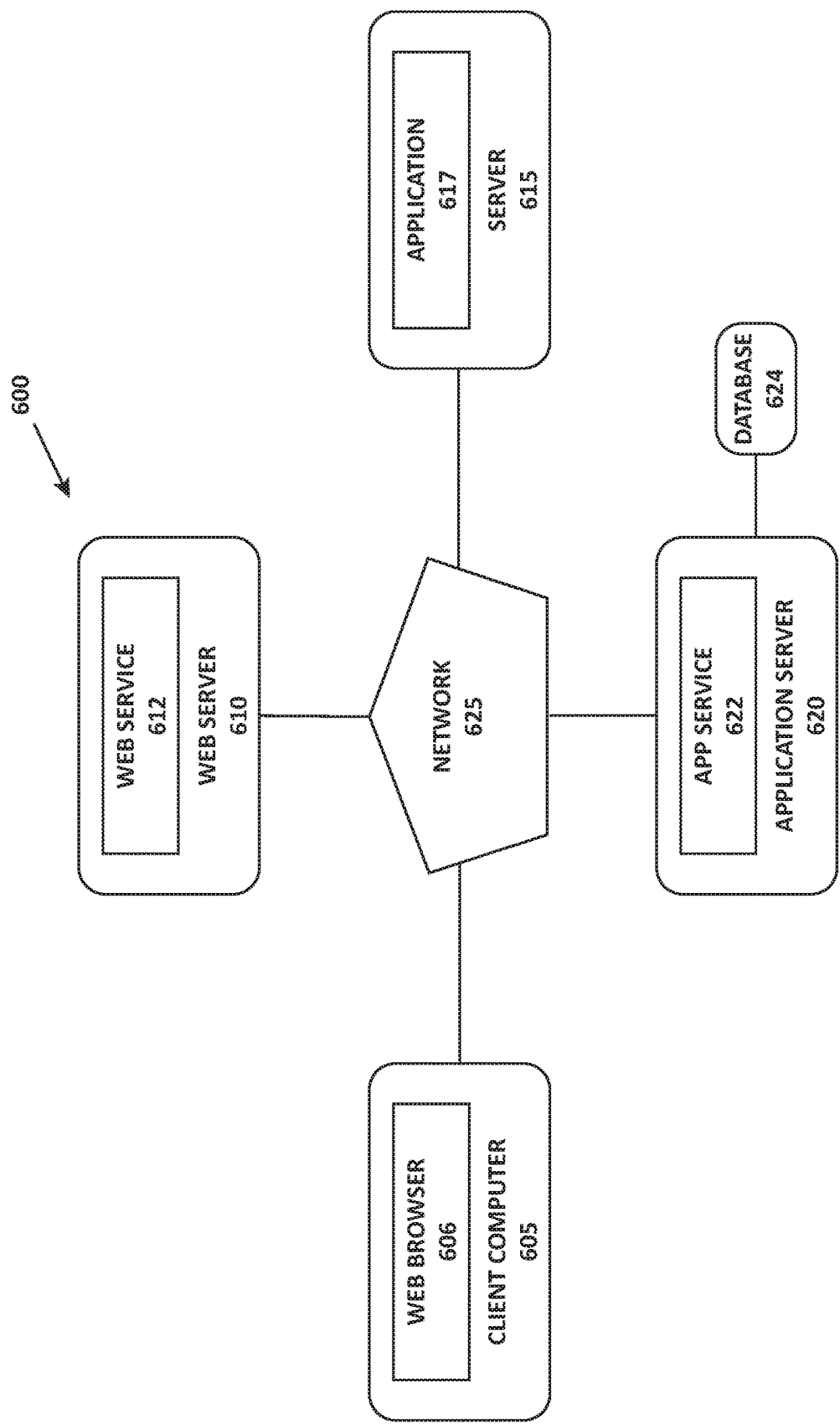
FIG. 6 illustrates an example computing system, according to one embodiment described herein.

FIG. 6 illustrates an example computing system, according to one embodiment described herein. As shown, the computing environment 600 includes a client computer 605, a web server 610, a server 615 including an application 617, and an application server 620. The client computer 605 may be a physical system (e.g., a POS system, a desktop computer, laptop computer, mobile device, etc.) or a virtual computing instance executing in the cloud. The client computer 605 includes a web browser 606. A user may access data services through the web browser 606 over a network 625 (e.g., the Internet).

For instance, a user may access a web service 612 executing on a web server 610 (e.g., a manufacturer website including driver software fora POS device). In one embodiment, the web service 612 provides a web interface for an application server 620 (e.g., executing an application service 622). More specifically, the application service 622 provides a database 624. The database 624 may include data presented to users on the web browser 606.

FIG. 7 further illustrates an example computing system 700, according to one embodiment described herein. The server 715 generally includes a processor 704 connected via a bus to a memory 706, a network interface device 718, a storage 708, an input device 721, and an output device 722. The server 715 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 704 is included to be representative of a single CPU, multiple CPUs, a single CPU having multiple processing cores, and the like. Similarly, the memory 706 may be a random access memory. While the memory 706 is shown as a single identity, it should be understood that the memory 706 may comprise a plurality of modules, and that the memory 706 may exist at multiple levels, from high speed registers and caches to lower speed but larger DRAM chips. The network interface device 718 may be any type of network communications device allowing the server 715 to communicate with other computers via the network, including a wired or wireless network interface.

The storage 708 may be a persistent storage device. Although the storage 708 is shown as a single unit, the storage 708 may be a combination of fixed and/or removable storage devices, such as fixed disc drives, solid state drives, removable memory cards, optical storage and network storage systems. Further, the storage 708 may include a suitable electronic database.

As shown, the memory 706 contains the application 717, which may be an application generally executed to take actions described herein (e.g., as discussed above with regard to FIGS. 1-5. Storage 708 contains the zone information 716 and associations 719 (e.g., the association table 184 discussed above with regard to FIG. 1A).

The input device 721 may provide a keyboard and/or a mouse, etc. The output device 722 may be any conventional display screen. Although shown separately from the input device 721, the output device 722 and input device 721 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present invention, other and further embodiments of the invention may be devised without departing from the basic scope thereof, and the scope thereof is determined by the claims that follow.

What is claimed is:

1. A method comprising:
determining that a point of sale (POS) component device has physically moved from a first POS system, associated with a first zone and comprising a first one or more POS component devices, to a second POS system, associated with a second zone and comprising a second one or more POS component devices, by automatically recognizing that an identifier associated with the POS component device is located in the second zone using an optical sensor, wherein the first POS system and the second POS system are POS systems in a same retail store;
automatically configuring the POS component device to function within the second POS system;
detecting at least one requirement associated with the first POS system associated in the first zone;
determining that the at least one requirement associated with the first POS system is met based on determining that the POS component device is associated with the first POS system;
determining that the at least one requirement associated with the first POS system is not met based on determining that the POS component device has moved to the second POS system,
  wherein the at least one requirement relates to required POS component devices for the first POS system; and
responsive to determining that the at least one requirement associated with the first POS system is not met, disabling the first POS system.

2. The method of claim 1, further comprising assigning the identifier to the POS component device.

3. The method of claim 1, further comprising determining a dimension of the zone.

4. The method of claim 1, further comprising detecting movement of the POS component device from the first zone to the second zone using the optical sensor.

5. The method of claim 1, further comprising monitoring a change in a component configuration of the second POS system using the optical sensor.

6. The method of claim 1, wherein configuring the POS component device further comprises wirelessly programming the POS component device to function within the second POS system in place of the first POS system.

7. The method of claim 1, wherein using the optical sensor comprises using at least one of a camera, a radio frequency wave receiver, a barcode reader, a pattern reader, a light emitting diode, or an infrared reader.

8. The method of claim 1, wherein the optical sensor comprises a camera, and wherein automatically recognizing that the identifier associated with the POS component device is located in the second zone comprises recognizing the identifier in an image captured using the camera.

9. A system comprising:
a processor; and
a memory storing a program, which, when executed on the processor, performs an operation, the operation comprising:
determining that a point of sale (POS) component device has physically moved from a first POS system, associated with a first zone and comprising a first one or more POS component devices, to a second POS system, associated with a second zone and comprising a second one or more POS component devices, by automatically recognizing that an identifier associated with the POS component device is located in the second zone using an optical sensor, wherein the first POS system and the second POS system are POS systems in a same retail store;
automatically configuring the POS component device to function within the second POS system;
detecting at least one requirement associated with the first POS system associated in the first zone;
determining that the at least one requirement associated with the first POS system is met based on determining that the POS component device is associated with the first POS system;
determining that the at least one requirement associated with the first POS system is not met based on determining that the POS component device has moved to the second POS system,
  wherein the at least one requirement relates to required POS component devices for the first POS system; and
responsive to determining that the at least one requirement associated with the first POS system is not met, disabling the first POS system.

10. The system of claim 9, the operation further comprising determining a dimension of the zone.

11. The system of claim 9, the operation further comprising detecting movement of the POS component device from the first zone to the second zone using the optical sensor.

12. The system of claim 9, the operation further comprising monitoring a change in a component configuration of the second POS system using the optical sensor.

13. The system of claim 9, wherein automatically configuring the POS component device to function within the second POS system comprises wirelessly programming the POS component device to function within the second POS system in place of the first POS system.

14. The system of claim 9, wherein using the optical sensor comprises using at least one of a camera, a radio frequency wave receiver, a barcode reader, a pattern reader, a light emitting diode, or an infrared reader.

15. The system of claim 9, wherein automatically configuring the POS component device to function within the second POS system comprises:
identifying driver software associated with the POS component device and the second POS system; and
automatically configuring the second POS system to operate with the POS component device using the driver software.

16. The system of claim 9, wherein the optical sensor comprises a camera, and wherein automatically recognizing that the identifier associated with the POS component device is located in the second zone comprises recognizing the identifier in an image captured using the camera.

17. A computer program product comprising:
a non-transitory computer-readable storage medium having computer-readable program code embodied therewith, the computer-readable program code executable by one or more computer processors to perform an operation, the operation comprising:
determining that a point of sale (POS) component device has physically moved from a first POS system, associated with a first zone and comprising a first one or more POS component devices, to a second POS system, associated with a second zone and comprising a second one or more POS component devices, by automatically recognizing that an identifier associated with the POS component device is located in the second zone using an optical sensor, wherein the first POS system and the second POS system are POS systems in a same retail store;

automatically configuring the POS component device to function within the second POS system;

detecting at least one requirement associated with the first POS system associated in the first zone, wherein the at least one requirement relates to required POS components for the first POS system;

determining that the at least one requirement associated with the first POS system is met based on determining that the POS component device is associated with the first POS system;

determining that the at least one requirement associated with the first POS system is not met based on determining that the POS component device has moved to the second POS system, wherein the at least one requirement relates to required POS component devices for the first POS system; and responsive to determining that the at least one requirement associated with the first POS system is not met, disabling the first POS system.

18. The computer program product of claim 17, wherein the optical sensor comprises a camera, and wherein automatically recognizing that the identifier associated with the POS component device is located in the second zone comprises recognizing the identifier in an image captured using the camera.

* * * * *